O. P. JONES.
ROUNDABOUT SWING.
APPLICATION FILED JAN. 7, 1911. RENEWED OCT. 11, 1912.
1,044,391.
Patented Nov. 12, 1912.
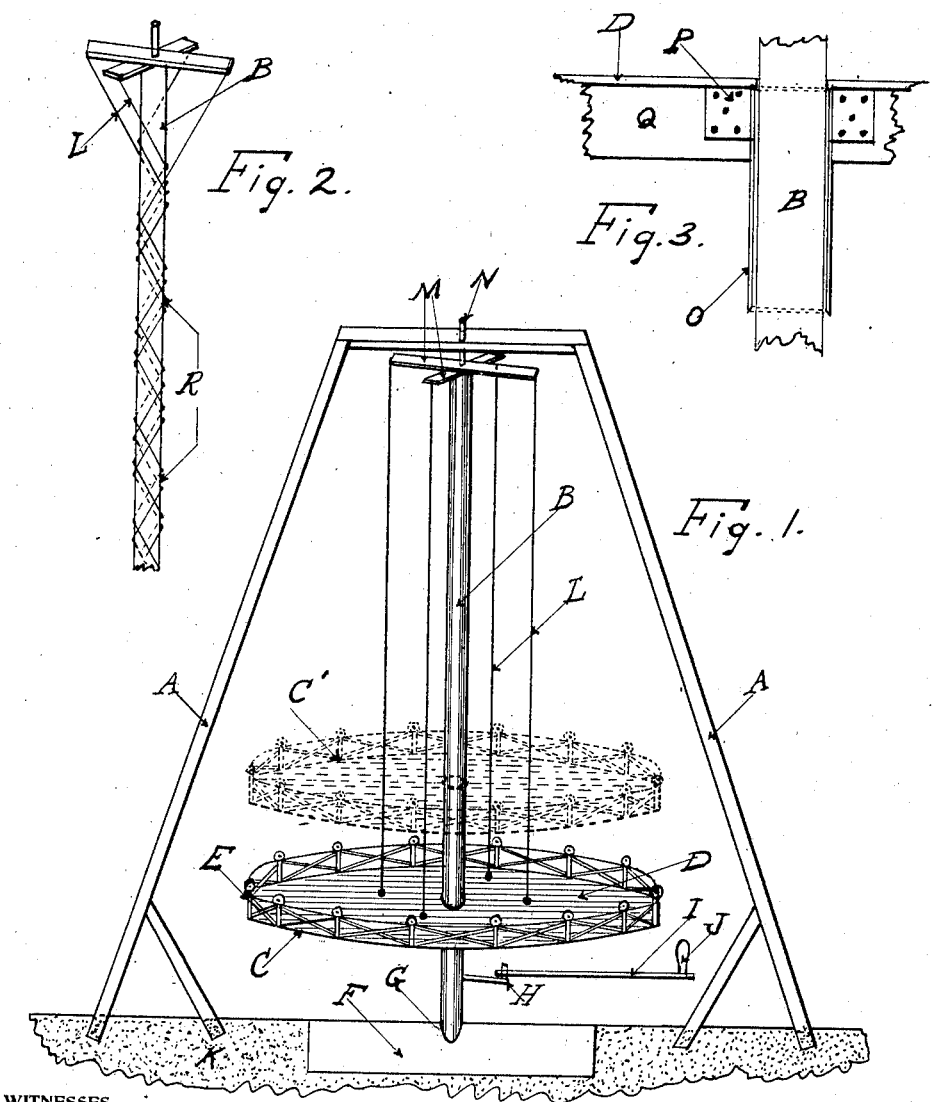

UNITED STATES PATENT OFFICE.

OLIVER P. JONES, OF BEAUMONT, TEXAS.

ROUNDABOUT-SWING.

1,044,391. Specification of Letters Patent. Patented Nov. 12, 1912.

Application filed January 7, 1911, Serial No. 601,473. Renewed October 11, 1912. Serial No. 725,307.

*To all whom it may concern:*

Be it known that I, OLIVER P. JONES, a citizen of the United States, residing in Beaumont, in the county of Jefferson and the State of Texas, have invented a new and useful Device or Machine which is Designated a "Roundabout-Swing," of which the following is a specification.

My invention relates to improvements in round about swings, in which a revoluble platform is suspended around a revoluble center shaft by means of ropes, wires or chains fastened to a cross piece at the upper end of the revoluble center shaft; and the object of my improvement is to produce a combination revolving-rising, reversing revolving-falling movement in a round about swing. I attain such objects by the mechanism illustrated in the accompanying drawings, which form part of this specification, in which—

Figure 1, shows a perspective view of the round about swing; the dotted portion showing the platform elevated when ropes, wires or chains are wound around a revoluble center shaft. Fig. 2, is a perspective view showing the ropes, wires or chains wound around a revoluble center shaft, which causes the platform to rise to the position shown by dotted lines in Fig. 1. Fig. 3, is a sectional view of a sliding collar around the revoluble center shaft, to which are fastened the joists of the platform.

Similar letters refer to similar parts throughout the several views.

Through the cross piece forming the top of the supports A A, is a hole, through which passes a dowel N, which passing through the cross pieces M, is securely fastened to the upper end of a revoluble center shaft B, the lower end of which is shaped to revolve easily in a socket G in a plate F, solidly set in concrete or ground K.

To the cross pieces M are fastened ropes, wires or chains L, and fastened to the lower ends of the ropes, wires or chains L, is a revoluble platform C, encircled by a railing E.

A cross arm H with upright dowel is securely fastened to the revoluble center shaft B, below the revoluble platform C, and loosely attached thereto is a rod I to which is fastened a handle J.

Encircling the revoluble center shaft B, is a collar O, Fig. 3, having plates P attached, to which are fastened the floor joists Q, to which is fastened the floor D of the revoluble platform C.

Taking hold of the handle J, attached to the rod I, and exerting the required pressure, causes the revoluble center shaft B to revolve partly around, and the cross pieces M being securely fastened to the revoluble center shaft B, and the ropes, wires or chains L being securely fastened to the cross pieces M and the revoluble platform C, causes the ropes, wires or chains L to be partly pulled around, thereby causing the revoluble platform C to revolve around the revoluble center shaft B, and revolving until all motion is lost, and the pressure on the rod I being exerted in the opposite direction, causes the revoluble platform C to reverse the revolutions. Greater momentum having been acquired with each reversed revolution of the revoluble platform C, the momentum will cause the revoluble platform C to revolve several times around the revoluble center shaft B, as shown at R, Fig. 2, causing the revoluble platform C to rise to position shown at C'. Reversing the revolving of the revoluble platform C, causes the revoluble platform C to lower to its original position.

Having now described my invention, I claim as new and desire to secure by Letters Patent—

The combination in a round about swing, of a vertical revoluble center shaft, pivotally set in a base at the lower end and journaled into a cross piece of the supports at the upper end; a round platform revolving around the vertical revoluble center shaft; cross pieces securely fastened to the upper end of the vertical revoluble center shaft having attached thereto ropes, wires or chains supporting the circularly revoluble platform; the upright revoluble center shaft having a short arm or lever securely attached to it beneath the revoluble platform, with its outer end squarely bent up so that a long lever with a hole in the end can
5 be attached to the end of the short arm and reaching out from beneath the revoluble platform so that it will be easily manipulated by hand from the outside, substantially as and for the purpose described.

OLIVER P. JONES.

Witnesses:
C. P. COLLINS,
ELVINA JONES.